United States Patent
Wang et al.

(10) Patent No.: US 9,350,354 B2
(45) Date of Patent: May 24, 2016

(54) PUF CIRCUIT BASED ON ZTC POINT OF MOSFET

(71) Applicant: Ningbo University, Ningbo (CN)

(72) Inventors: Pengjun Wang, Ningbo (CN); Xuelong Zhang, Ningbo (CN); Yuejun Zhang, Ningbo (CN)

(73) Assignee: Ningbo University, Ningbo (CN)

( * ) Notice: Subject to any disclaimer, the term of this patent is extended or adjusted under 35 U.S.C. 154(b) by 0 days.

(21) Appl. No.: 14/709,462

(22) Filed: May 11, 2015

(65) Prior Publication Data
US 2016/0079982 A1    Mar. 17, 2016

(30) Foreign Application Priority Data

Sep. 15, 2014    (CN) .......................... 2014 1 0467756

(51) Int. Cl.
*H03K 19/0948*    (2006.01)

(52) U.S. Cl.
CPC .................................. *H03K 19/0948* (2013.01)

(58) Field of Classification Search
None
See application file for complete search history.

(56) References Cited

U.S. PATENT DOCUMENTS

| | | | | |
|---|---|---|---|---|
| 8,446,208 B2* | 5/2013 | Gruber | ................. | H03K 17/145 327/512 |
| 8,513,980 B2* | 8/2013 | Payne | .................. | H03K 5/2481 327/65 |
| 2006/0267668 A1* | 11/2006 | Porter | .................... | G01K 7/015 327/512 |

* cited by examiner

*Primary Examiner* — Long Nguyen
(74) *Attorney, Agent, or Firm* — Matthias Scholl, PC; Matthias Scholl

(57) ABSTRACT

A physical unclonable function (PUF) circuit based on a zero temperature coefficient (ZTC) point of a metal oxide semiconductor field effect transistor (MOSFET), the PUF circuit including at least one PUF circuit unit. Each PUF circuit unit includes: a deviation signal generating circuit module, a signal selection circuit, and a comparison output circuit. The deviation signal generating circuit module includes two deviation signal generating circuits. A control voltage input terminal of the deviation signal generating circuit is supplied with a control voltage, and the control voltage enables a first NMOS, a second NMOS, a third NMOS, a fourth NMOS, a fifth NMOS, a sixth NMOS, a seventh NMOS, and an eighth NMOS to work at a ZTC point.

3 Claims, 4 Drawing Sheets

PUF CIRCUIT BASED ON ZTC POINT OF MOSFET

CROSS-REFERENCE TO RELATED APPLICATIONS

Pursuant to 35 U.S.C. §119 and the Paris Convention Treaty, this application claims the benefit of Chinese Patent Application No. 201410467756.7 filed Sep. 15, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a physical unclonable function (PUF) circuit, and more particularly to a PUF circuit based on a zero temperature coefficient (ZTC) point of a metal oxide semiconductor field effect transistor (MOSFET).

2. Description of the Related Art

The PUF is designed based on weak deviation of the process parameters in manufacture of the integrated circuit. The function performance of the circuit tends to be affected by the supply voltage, temperature, and aging factors. Robustness is a nature that the PUF circuit works normally under different factors and that seriously influences the security of the application system. A typical method for improving the robustness of the PUF circuit includes adopting an error-correcting circuit and changing the operation sequence of the circuit, which, however, consumes a large circuit area.

SUMMARY OF THE INVENTION

In view of the above-described problems, it is one objective of the invention to provide a PUF circuit based on a ZTC point of an MOSFET. The PUF circuit possesses high robustness and is capable of saving the circuit area cost.

To achieve the above objective, in accordance with one embodiment of the invention, there is provided a PUF circuit based on a ZTC point of an MOSFET. The PUF circuit comprises at least one PUF circuit unit. Each PUF circuit unit comprises: a deviation signal generating circuit module, a signal selection circuit, and a comparison output circuit. The deviation signal generating circuit module comprises two deviation signal generating circuits. Each deviation signal generating circuit comprises: a first NMOS, a second NMOS, a third NMOS, a fourth NMOS, a fifth NMOS, a sixth NMOS, a seventh NMOS, an eighth NMOS, a first resistor, a second resistor, a third resistor, a fourth resistor, a fifth resistor, a sixth resistor, a seventh resistor, and an eighth resistor, a control voltage input terminal, a supply voltage input terminal, a ground terminal, a first deviation signal output terminal, a second deviation signal output terminal, a third deviation signal output terminal, a fourth deviation signal output terminal, a fifth deviation signal output terminal, a sixth deviation signal output terminal, a seventh deviation signal output terminal, and an eighth deviation signal output terminal. Each NMOS comprises: a gate, a source, and a drain. Each resistor comprises two ends. The gate of the first NMOS, the gate of the second NMOS, the gate of the third NMOS, the gate of the fourth NMOS, the gate of the fifth NMOS, the gate of the sixth NMOS, the gate of the seventh NMOS, and the gate of the eighth NMOS are connected, and the connecting terminal thereof serves as the control voltage input terminal of the deviation signal generating circuit. The control voltage input terminal of the deviation signal generating circuit is supplied with a control voltage, and the control voltage enables the first NMOS, the second NMOS, the third NMOS, the fourth NMOS, the fifth NMOS, the sixth NMOS, the seventh NMOS, and the eighth NMOS to work at a ZTC point. One end of the first resistor, one end of the second resistor, one end of the third resistor, one end of the fourth resistor, one end of the fifth resistor, one end of the sixth resistor, one end of the seventh resistor, and one end of the eighth resistor are connected, and a connecting terminal thereof serves as the supply voltage input terminal of the deviation signal generating circuit. The supply voltage input terminal of the deviation signal generating circuit is supplied with a supply voltage. The source of the first NMOS, the source of the second NMOS, the source of the third NMOS, the source of the fourth NMOS, the source of the fifth NMOS, the source of the sixth NMOS, the source of the seventh NMOS, and the source of the eighth NMOS are connected, and a connecting terminal thereof serves as the ground terminal of the deviation signal generating circuit. The drain of the first NMOS is connected to the other end of the first resistor, and a connecting terminal thereof serves as the first deviation signal output terminal of the deviation signal generating circuit. The drain of the second NMOS is connected to the other end of the second resistor, and a connecting terminal thereof serves as the second deviation signal output terminal. The drain of the third NMOS is connected to the other end of the third resistor, and a connecting terminal thereof serves as the third deviation signal output terminal. The drain of the fourth NMOS is connected to the other end of the fourth resistor, and a connecting terminal thereof serves as the fourth deviation signal output terminal. The drain of the fifth NMOS is connected to the other end of the fifth resistor, and a connecting terminal thereof serves as the fifth deviation signal output terminal. The drain of the sixth NMOS is connected to the other end of the sixth resistor, and a connecting terminal thereof serves as the sixth deviation signal output terminal. The drain of the seventh NMOS is connected to the other end of the seventh resistor, and a connecting terminal thereof serves as the seventh deviation signal output terminal. The drain of the eighth NMOS is connected to the other end of the eighth resistor, and a connecting terminal thereof serves as the eighth deviation signal output terminal. The first NMOS, the second NMOS, the third NMOS, the fourth NMOS, the fifth NMOS, the sixth NMOS, the seventh NMOS, and the eighth NMOS have the same standard. The first resistor, the second resistor, the third resistor, the fourth resistor, the fifth resistor, the sixth resistor, the seventh resistor, and the eighth resistor have equivalent resistance value no smaller than 10 k$\Omega$. The first deviation signal output terminal, the second deviation signal output terminal, the third deviation signal output terminal, the fourth deviation signal output terminal, the fifth deviation signal output terminal, the sixth deviation signal output terminal, the seventh deviation signal output terminal, and the eighth deviation signal output terminal of each of the two deviation signal generating circuits are respectively connected to the signal selection circuit. The signal selection circuit is connected to the comparison output circuit.

In a class of this embodiment, the signal selection circuit is formed by two 1-of-8 data selectors comprising a first data selector and a second data selector. The first deviation signal output terminal, the second deviation signal output terminal, the third deviation signal output terminal, the fourth deviation signal output terminal, the fifth deviation signal output terminal, the sixth deviation signal output terminal, the seventh deviation signal output terminal, and the eighth deviation signal output terminal of the first deviation signal generating circuit are connected to a signal input terminal of the first data selector. The first deviation signal output terminal, the second deviation signal output terminal, the third deviation signal output terminal, the fourth deviation signal output terminal, the fifth deviation signal output terminal, the sixth deviation signal output terminal, the seventh deviation signal output terminal, and the eighth deviation signal output terminal of the second deviation signal generating circuit are connected to a signal input terminal of the second data selector. A signal output terminal of the first data selector and a signal output terminal of the second data selector are connected to a signal input terminal of the comparison output circuit.

In a class of this embodiment, the first comparison output circuit comprises: a ninth NMOS, a tenth NMOS, an eleventh NMOS, a twelfth NMOS, a thirteenth NMOS, a fourteenth NMOS, a first PMOS, a second PMOS, a third PMOS, and a fourth PMOS. A source of the ninth NMOS is grounded. A drain of the ninth NMOS, a drain of the tenth NMOS, and a drain of the eleventh NMOS are connected. A source of the tenth NMOS, a drain of the thirteenth NMOS, and a drain of the fourteenth NMOS are connected. A source of the eleventh NMOS, a drain of the twelfth NMOS, and a source of the thirteenth NMOS are connected. A source of the fourteenth NMOS, a drain of the first PMOS, a drain of the second PMOS, a gate of the twelfth NMOS, and a gate of the third PMOS are connected and a connecting terminal thereof serves as a signal output terminal of the comparison output circuit for outputting a response signal. A source of the twelfth NMOS, a drain of the third PMOS, a drain of the fourth PMOS, a gate of the fourteenth NMOS, and a gate of the second PMOS are connected and a connecting terminal thereof serves as a reverse signal output terminal of the comparison output circuit for outputting a reverse response signal. A source of the first PMOS, a source of the second PMOS, a source of the third PMOS, a source of the fourth PMOS, and a gate of the thirteenth NMOS are connected and a connecting terminal thereof serves as a source terminal of the comparison output circuit for introducing a supply voltage. A gate of the ninth NMOS, a gate of the first PMOS, and a gate of the fourth PMOS are connected, and a connecting terminal thereof serves as a precharge signal input terminal for introducing a precharge signal. A gate of the tenth NMOS serves as a first signal input terminal of the comparison input circuit. The first signal input terminal of the comparison input circuit is connected to a signal output terminal of the first data selector. A gate of the eleventh NMOS serves as a second signal input terminal of the comparison input circuit. The second signal input terminal of the comparison input circuit is connected to a signal output terminal of the second data selector. The function of a sense amplifier is achieved by the comparison output circuit, thus, the evaluation speed of the circuit is improved and the fast output of the circuit is realized.

Advantages according to embodiments of the invention are summarized as follows: the first NMOS, the second NMOS, the third NMOS, the fourth NMOS, the fifth NMOS, the sixth NMOS, the seventh NMOS, the eighth NMOS, the first resistor, the second resistor, the third resistor, the fourth resistor, the fifth resistor, the sixth resistor, the seventh resistor, and the eighth resistor form the deviation signal generating circuit. The size of the deviation output signal of the deviation signal generating circuit is determined by the non-process parameters as well as the process parameters. The deviation signal generating circuit is supplied with the control voltage to enable the first NMOS, the second NMOS, the third NMOS, the fourth NMOS, the fifth NMOS, the sixth NMOS, the seventh NMOS, and the eighth NMOS to work at the ZTC point, so that neither leakage current of any NMOS working at the ZTC point will not be affected by the temperature. In addition, the first resistor, the second resistor, the third resistor, the fourth resistor, the fifth resistor, the sixth resistor, the seventh resistor, and the eighth resistor have resistance values no smaller than $10 k\Omega$, thereby making temperature influence negligible on the resistance values. Thus, the deviation signal generating circuit overcomes the influence of the non-process parameters and enhances the robustness of the components thereof to the non-process parameters. As the function performance of the whole PUF circuit is determined by the robustness of the deviation signal generating circuit, the PUF circuit of the invention possesses strong robustness and is capable of saving the cost of the circuit area on the premise of no addition of other circuits.

When the signal generating circuit is formed by two 1-of-8 data selectors and the selected deviated voltage signal passes through the 1-of-8 data selector, deviation will happen again in the originally selected deviated voltage signal of the deviation signal generating circuit due to the influence of the process deviation, which may further disturb the data correlation between the response of the PUF circuit and the circuit structure and make the function performance of the PUF circuit much unpredictable, thereby further improving the security of the PUF circuit.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a PUF circuit based on a ZTC point of an MOSFET are described below. It should be noted that the following examples are intended to describe and not to limit the invention.

Figure 1:
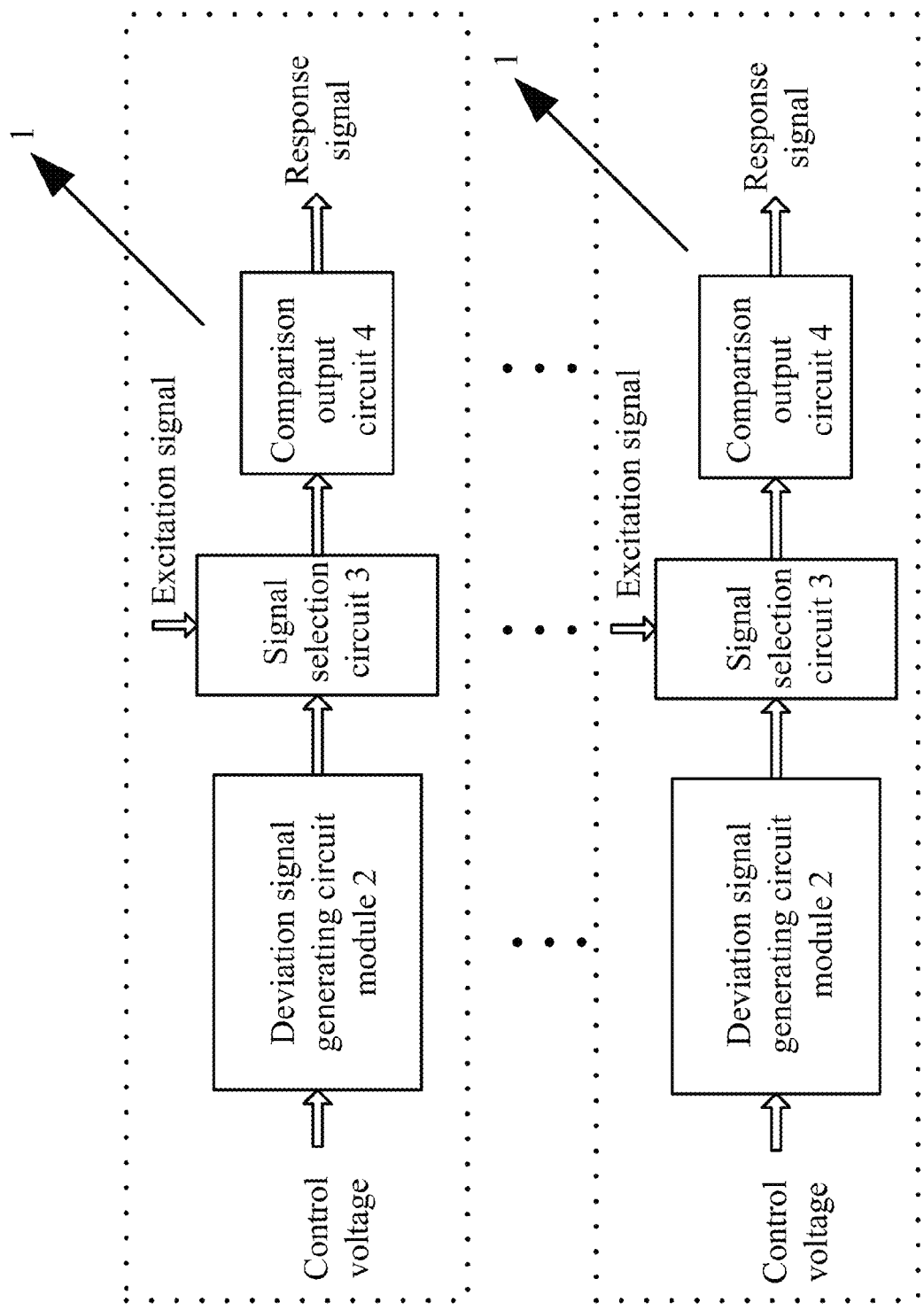
FIG. 1 is a schematic block diagram of a PUF circuit based on a ZTC point of an MOSFET in accordance with one embodiment of the invention.
Figure 2:
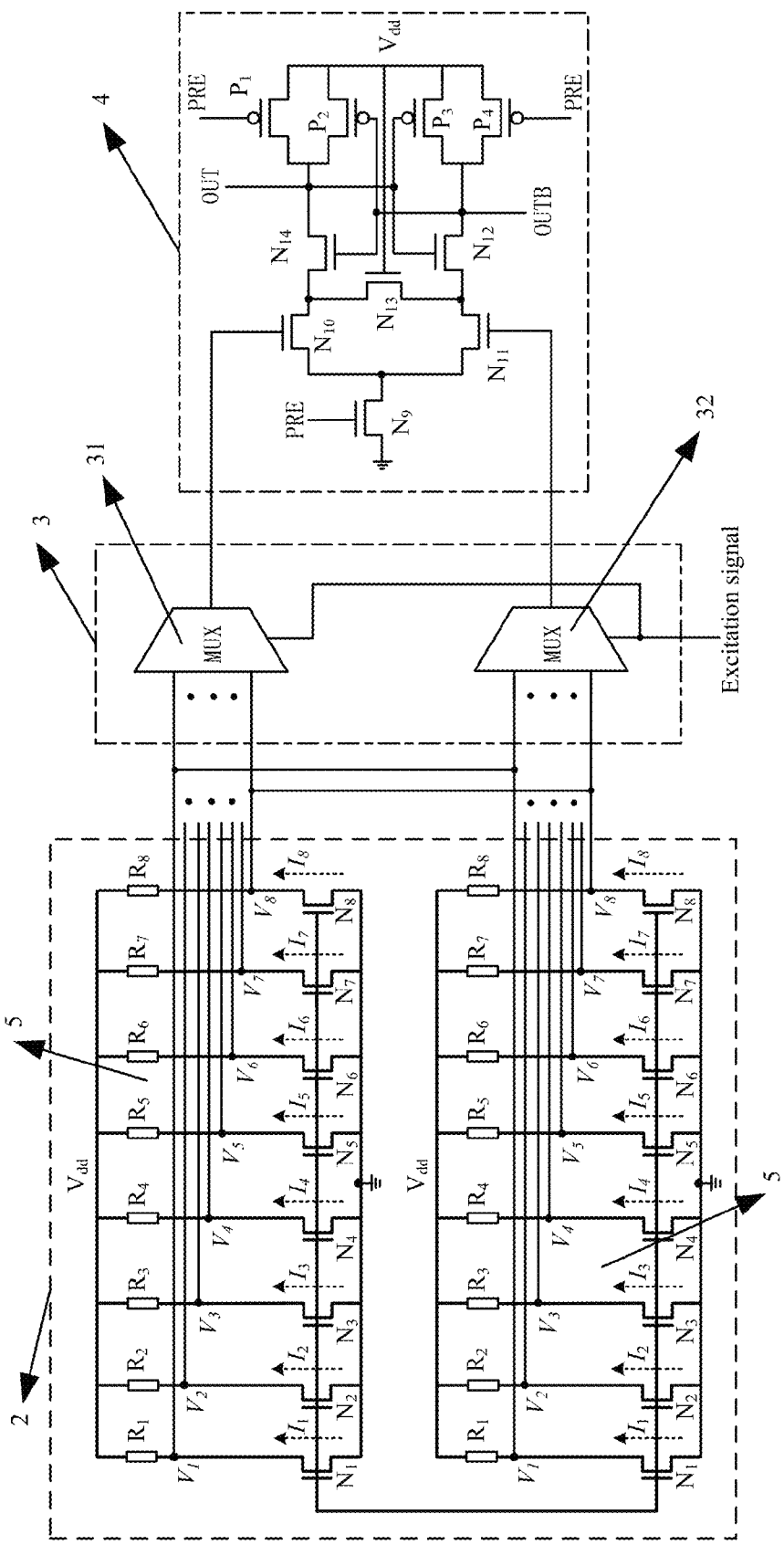
FIG. 2 is a circuit diagram of a PUF circuit unit in accordance with one embodiment of the invention.

As shown in FIGS. 1-2, a PUF circuit based on a zero temperature coefficient point of a MOSFET comprises at least one PUF circuit unit 1. The PUF circuit unit 1 comprises: a deviation signal generating circuit module 2, a signal selection circuit 3, and a comparison output circuit 4. The deviation signal generating circuit module 2 is formed by two deviation signal generating circuits 5. Each deviation signal generating circuit comprises: a first NMOS N1, a second NMOS N2, a third NMOS N3, a fourth NMOS N4, a fifth NMOS N5, a sixth NMOS N6, a seventh NMOS N7, an eighth NMOS N8, a first resistor R1, a second resistor R2, a third resistor R3, a fourth resistor R4, a fifth resistor R5, a sixth resistor R6, a seventh resistor R7, and an eighth resistor R8. A gate of the first NMOS N1, a gate of the second NMOS N2, a gate of the third NMOS N3, a gate of the fourth NMOS N4, a gate of the fifth NMOS N5, a gate of the sixth NMOS N6, a gate of the seventh NMOS N7, and a gate of the eighth NMOS N8 are connected, and a connecting terminal thereof serves as a control voltage input terminal of the deviation signal generating circuit 5. The control voltage input terminal of the deviation signal generating circuit 5 is supplied with a control voltage VC. The control voltage VC enables the first NMOS N1, the second NMOS N2, the third NMOS N3, the fourth NMOS N4, the fifth NMOS N5, the sixth NMOS N6, the seventh NMOS N7, and the eighth NMOS N8 to work at a zero temperature coefficient point. One end of the first resistor R1, one end of the second resistor R2, one end of the third resistor R3, one end of the fourth resistor R4, one end of the fifth resistor R5, one end of the sixth resistor R6, one end of the seventh resistor R7, and one end of the eighth resistor R8 are connected, and a connecting terminal thereof serves as a supply voltage input terminal of the deviation signal generating circuit 5. The supply voltage input terminal of the deviation signal generating circuit 5 is supplied with a supply voltage Vdd. A source of the first NMOS N1, a source of the second NMOS N2, a source of the third NMOS N3, a source of the fourth NMOS N4, a source of the fifth NMOS N5, a source of the sixth NMOS N6, a source of the seventh NMOS N7, and a source of the eighth NMOS N8 are connected, and a connecting terminal thereof serves as a ground terminal of the deviation signal generating circuit 5. A drain of the first NMOS N1 is connected to the other end of the first resistor R1, and a connecting terminal thereof serves as a first deviation signal output terminal of the deviation signal generating circuit 5 to output a first deviation signal (output voltage) V1. A drain of the second NMOS N2 is connected to the other end of the second resistor R2, and a connecting terminal thereof serves as a second deviation signal output terminal of the deviation signal generating circuit 5 to output a second deviation signal (output voltage) V2. A drain of the third NMOS N3 is connected to the other end of the third resistor R3, and a connecting terminal thereof serves as a third deviation signal output terminal of the deviation signal generating circuit 5 to output a third deviation signal (output voltage) V3. A drain of the fourth NMOS N4 is connected to the other end of the fourth resistor R4, and a connecting terminal thereof serves as a fourth deviation signal output terminal of the deviation signal generating circuit 5 to output a fourth deviation signal (output voltage) V4. A drain of the fifth NMOS N5 is connected to the other end of the fifth resistor R5, and a connecting terminal thereof serves as a fifth deviation signal output terminal of the deviation signal generating circuit 5 to output a fifth deviation signal (output voltage) V5. A drain of the sixth NMOS N6 is connected to the other end of the sixth resistor R6, and a connecting terminal thereof serves as a sixth deviation signal output terminal of the deviation signal generating circuit 5 to output a sixth deviation signal (output voltage) V6. A drain of the seventh NMOS N7 is connected to the other end of the seventh resistor R7, and a connecting terminal thereof serves as a seventh deviation signal output terminal of the deviation signal generating circuit 5 to output a seventh deviation signal (output voltage) V7. A drain of the eighth NMOS N8 is connected to the other end of the eighth resistor R8, and a connecting terminal thereof serves as an eighth deviation signal output terminal of the deviation signal generating circuit 5 to output an eighth deviation signal (output voltage) V8. The first NMOS N1, the second NMOS N2, the third NMOS N3, the fourth NMOS N4, the fifth NMOS N5, the sixth NMOS N6, the seventh NMOS N7, and the eighth NMOS N8 have the same standard. The first resistor R1, the second resistor R2, the third resistor R3, the fourth resistor R4, the fifth resistor R5, the sixth resistor R6, the seventh resistor R7, and the eighth resistor R8 have equivalent resistance value no smaller than 10 kΩ. The first deviation signal output terminal, the second deviation signal output terminal, the third deviation signal output terminal, the fourth deviation signal output terminal, the fifth deviation signal output terminal, the sixth deviation signal output terminal, the seventh deviation signal output terminal, and the eighth deviation signal output terminal of each of the two deviation signal generating circuits 5 are respectively connected to the signal selection circuit 3. The signal selection circuit 3 is connected to the comparison output circuit 4.

The signal selection circuit 3 in this example is formed by two 1-of-8 data selectors, i. e., a first data selector 31 and a second data selector 32. The first deviation signal output terminal, the second deviation signal output terminal, the third deviation signal output terminal, the fourth deviation signal output terminal, the fifth deviation signal output terminal, the sixth deviation signal output terminal, the seventh deviation signal output terminal, and the eighth deviation signal output terminal of the first deviation signal generating circuit 5 are connected to a signal input terminal of the first data selector 31. The first deviation signal output terminal, the second deviation signal output terminal, the third deviation signal output terminal, the fourth deviation signal output terminal, the fifth deviation signal output terminal, the sixth deviation signal output terminal, the seventh deviation signal output terminal, and the eighth deviation signal output terminal of the second deviation signal generating circuit 5 are connected to a signal input terminal of the second data selector 32. A signal output terminal of the first data selector 31 and a signal output terminal of the second data selector 32 are connected to a signal input terminal of the comparison output circuit 4.

In this example, the first comparison output circuit 4 comprises: a ninth NMOS N9, a tenth NMOS N10, an eleventh NMOS N11, a twelfth NMOS N12, a thirteenth NMOS N13, a fourteenth NMOS N14, a first PMOS P1, a second PMOS P2, a third PMOS P3, and a fourth PMOS P4. A source of the ninth NMOS N9 is grounded. A drain of the ninth NMOS N9, a drain of the tenth NMOS N10, and a drain of the eleventh NMOS N11 are connected. A source of the tenth NMOS N10, a drain of the thirteenth NMOS N13, and a drain of the fourteenth NMOS N14 are connected. A source of the eleventh NMOS N11, a drain of the twelfth NMOS N12, and a source of the thirteenth NMOS N13 are connected. A source of the fourteenth NMOS N14, a drain of the first PMOS P1, a drain of the second PMOS P2, a gate of the twelfth NMOS N12, and a gate of the third PMOS P3 are connected and a connecting terminal thereof serves as a signal output terminal of the comparison output circuit 4 for outputting a response signal OUT. A source of the twelfth NMOS N12, a drain of the third PMOS P3, a drain of the fourth PMOS P4, a gate of the fourteenth NMOS N14, and a gate of the second PMOS P2 are connected and a connecting terminal thereof serves as a reverse signal output terminal of the comparison output circuit 4 for outputting a reverse response signal OUTB. A source of the first PMOS P1, a source of the second PMOS P2, a source of the third PMOS P3, a source of the fourth PMOS P4, and a gate of the thirteenth NMOS N13 are connected and a connecting terminal thereof serves as a source terminal of the comparison output circuit 4 for introducing a supply voltage Vdd. A gate of the ninth NMOS N9, a gate of the first PMOS P1, and a gate of the fourth PMOS P4 are connected, and a connecting terminal thereof serves as a precharge signal input terminal for introducing a precharge signal PRE. A gate of the tenth NMOS N10 serves as a first signal input terminal of the comparison input circuit 4. The first signal input terminal of the comparison input circuit 4 is connected to the signal output terminal of the first data selector 31. A gate of the eleventh NMOS N11 serves as a second signal input terminal of the comparison input circuit 4. The second signal input terminal of the comparison input circuit 4 is connected to the signal output terminal of the second data selector 32.

Figure 3:
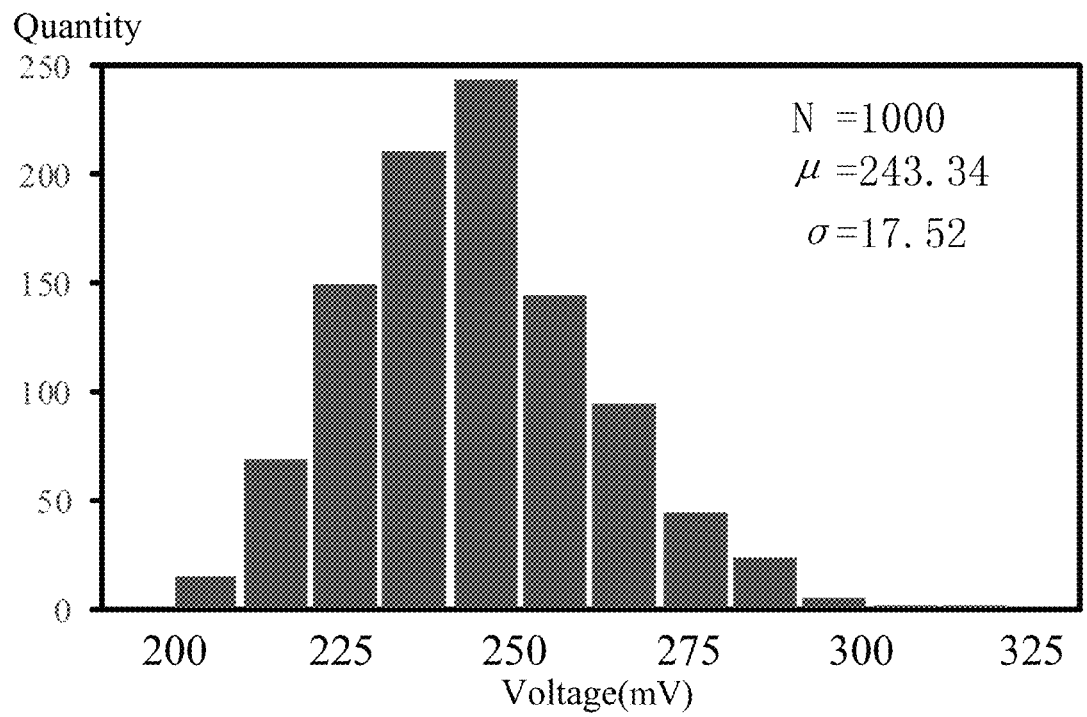
FIG. 3 is a Monte Carlo simulation diagram of an output deviation signal of a deviation signal generating circuit in accordance with one embodiment of the invention.

In this example, the deviation signal generating circuit 5 is formed by 8 columns of NMOSs and resistors, and the output voltages (V1, V2 ... V8) are determined by the non-process parameters as well as the process parameters. The function performance of the whole PUF circuit is determined by the robustness of the deviation signal generating circuit, and the leakage current of the NMOS working at the ZTC point is not affected by the temperature. Besides, the temperature influence on the resistors is negligible when the resistance value of the resistor exceeds 10 KΩ. Thus, the deviation output signal of the deviation signal generating circuit 5 possesses relatively strong robustness. The signal selection circuit is formed by the data selectors. Influenced by the process deviation, deviation occurs again in the originally selected output voltage signal of the deviation signal generating circuit after the output voltage signal passing through the data selector, which further disturbs the data correlation between the response of the PUF circuit and the circuit structure, and enables the function performance of the PUF circuit to be more unpredictable, thereby improving the security of the PUF circuit. The size of the output deviation signal is determined by the parameters of different components of the deviation signal generating circuit, and the purpose for outputting a relatively large deviation signal is achieved by regulating the width-to-length ratio of the channel of the NMOS and the resistance value. Under the most optimized control voltage, Spectre tool is utilized to conduct 1000 times Monte Carlo simulation on the deviation signal generating circuit, results of which are illustrated in FIG. 3. It is found from FIG. 3 that the size of the deviation signal of the output voltage presents a normal distribution, a mean value is 243.34 mV, a standard deviation is 17.52, and a largest range of the deviation voltage is 125 mV.

Figure 4:
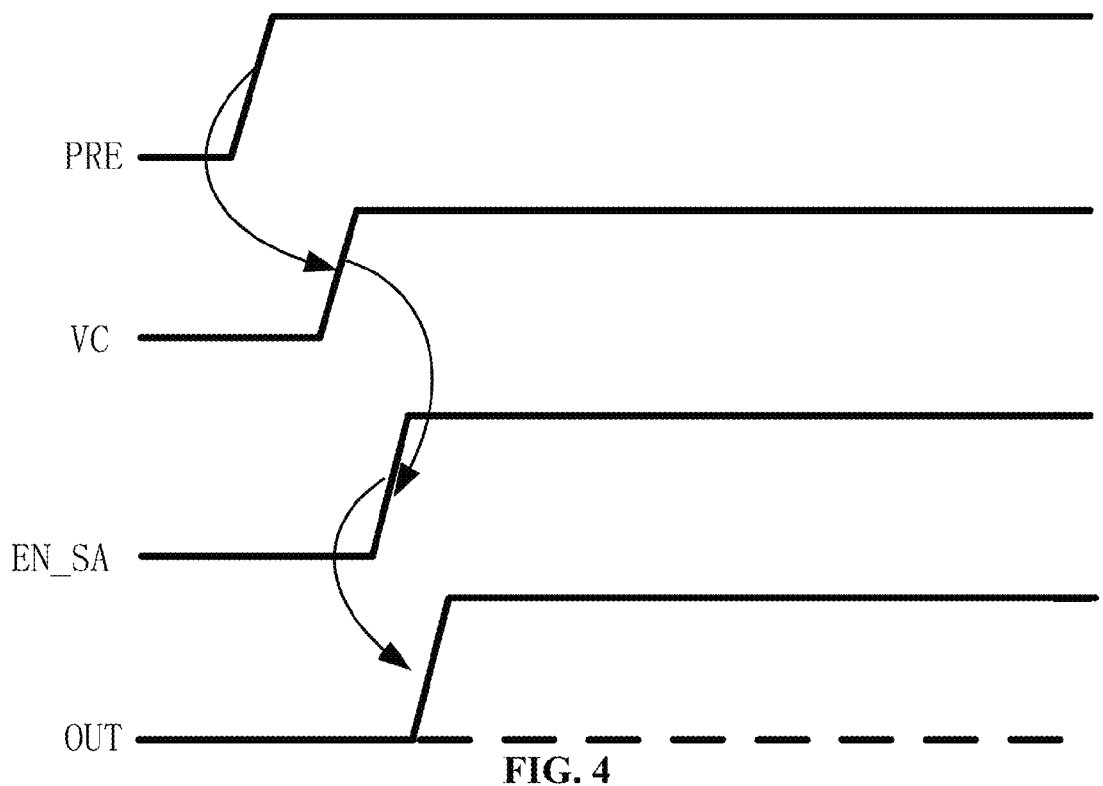
FIG. 4 is a schematic diagram of a working sequence a PUF circuit in accordance with one embodiment of the invention.

A voltage type sense amplifier is formed by the comparison output circuit 4. Working process of the PUF circuit includes a precharge stage and an evaluation stage. First, in the precharge stage, a control voltage VC of the gate of the NMOS in the deviation signal generating circuit 3 is low level. The deviation signal generating circuit 3 does not work, and the first signal output terminal and the second signal output terminal of the comparison output circuit 4 are charged by a precharge signal PRE to high level and the high level status thereof are maintained. Second, in the evaluation stage, a control voltage of the gate of each NMOS in the deviation signal generating circuit 3 is converted to high level. The comparison output circuit 4 starts work, and voltage signals of the first signal input terminal and the second signal input terminal of the comparison output circuit 4 produce random PUF circuit responses. A working sequence of the PUF circuit of this example is illustrated in FIG. 4 where PRE, VC, EN_SA, and OUT represent a precharge signal, a control voltage signal, an enabling signal of the sense amplifier, and an output signal.

A PUF circuit layout is designed in a full-custom mode using the TSMC 65 nm CMOS process. The layout area is 14.89 μm×12.14 μm, a total of 4 layers of metal lines are used. A right part of the layout is the comparison output circuit, a left part is a deviation signal generating circuit, and a middle part is the signal selecting circuit. The PUF circuit layout has a relatively small circuit area.

Figure 5:
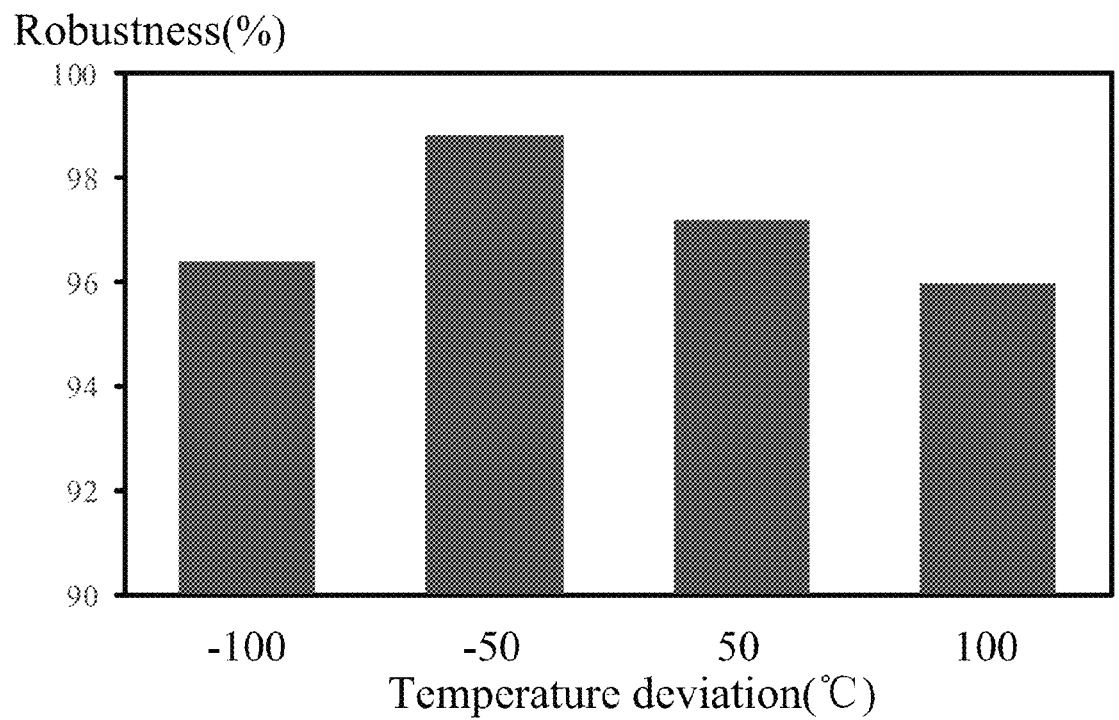
FIG. 5 is a robustness analysis chart of a PUF circuit at different temperatures in accordance with one embodiment of the invention.
Figure 6:
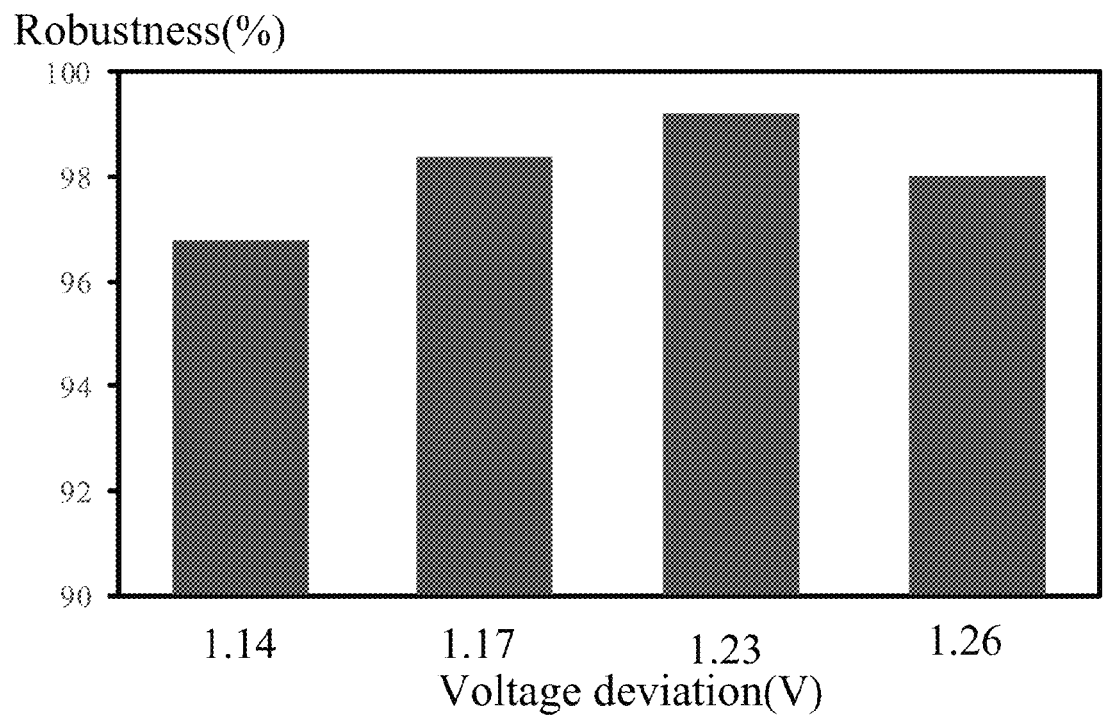
FIG. 6 is a robustness analysis chart of a PUF circuit at different voltages in accordance with one embodiment of the invention.

When the PUF circuit based on the ZTC point of the MOSFET comprises 25 PUF circuit units 1, it is a PUF circuit having 25-bit output signal. Monte Carlo simulation analysis is conducted on the 25-bit output signal PUF circuit, and the robustness of the output response thereof is observed under different working conditions. First, the output response results of the PUF circuit at the temperature deviations of ±100° C. and ±50° C. are simulated and then compared with the response signal output at a reference temperature so as to calculate the robustness percentage. Meanwhile, in order to improve the statistical reliability, ten excitation signals are exerted on the PUF circuit to calculate a mean value of the robustness. It is known from statistical results in FIG. 5 that a minimum robustness of the PUF circuit at various temperatures is 96%. Thereafter, the robustness of the PUF circuit in the presence of the working voltage deviation is analyzed. As the ZTC working point of the MOS is affected by the working voltage, the output responses of the PUF circuit are simulated at working voltage deviations of 1.14 V, 1.17 V, 1.23 V, and 1.26 V (standard voltage is 1.2 V). 10 excitation signals are exerted on the PUF circuit again, and a mean value of the robustness is calculated. Statistical results are shown in FIG. 6, and a minimum robustness of the PUF circuit at the preset voltage deviation is 96.8%. Thus, a minimum robustness of the PUF circuit at different conditions is 96%.

The PUF circuit of the invention is compared with other types of PUF circuits, and comparison results are listed in Table 1.

TABLE 1

Comparison of robustness among different types of PUF circuits

| | Document[2] | Document[3] | Document[4] | Document[5] | Present invention |
|---|---|---|---|---|---|
| Process | 180 nm CMOS | 130 nm CMOS | Xilinx Virtex 5 | 45 nm SOI-CMOS | 65 nm CMOS |
| Working voltage (V) | 1.8 | 1 | 1 | 1 | 1.2 |
| Robustness | 95.2% | 96% | 90% | 94.5% | 96% |

In the above table, Document[2]: Lim D, Lee J W, Gassend B, et al. Extracting secret keys from integrated circuits[J]. IEEE Transactions on Very Large Scale Integration (VLSI) Systems, 2005, 13(10): 1200-1205. Document[3]: Ying S, Holleman J, Otis B P. A digital 1.6 pJ/bit chip identification circuit using process variations[J]. IEEE Journal of Solid-State Circuits, 2008, 43(1):69-77. Document[4]: Majzoobi M, Koushanfar F. Time-bounded authentication of FPGAs[J], IEEE Transactions on Information Forensics and Security, 2011, 6(3):1123-1135. Document[5]: Lang L, Srivathsa S, Krishnappa D K, et al. Design and validation of arbiter-based PUFs for sub-45-nm low-power security applications[J] IEEE Transactions on Information Forensics and Security, 2012, 7(4): 1394-1403. It is indicated from Table 1 that the PUF circuit of the invention possesses stronger robustness than other PUF circuits.

In summary, the most optimized control voltage of the PUF circuit is determined mainly based on that all the ZTC points have the same ordinate value in conditions of MOSFET process deviations. Under the TSMC 65 nm CMOS process parameters, Monte Carlo simulation analysis is conducted on the circuit using Spectre tool, and the minimum robustness of the PUF circuit at different temperatures is 96% while the minimum robustness of the PUF circuit at different voltage deviations is 96.8%, so that the PUF circuit of the invention has stronger robustness than other PUF circuit.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A physical unclonable function (PUF) circuit based on a zero temperature coefficient (ZTC) point of a metal oxide semiconductor field effect transistor (MOSFET), the PUF circuit comprising at least one PUF circuit unit;

each PUF circuit unit comprising: a deviation signal generating circuit module, a signal selection circuit, and a comparison output circuit;

the deviation signal generating circuit module comprising two deviation signal generating circuits;

each deviation signal generating circuit comprises: a first NMOS, a second NMOS, a third NMOS, a fourth NMOS, a fifth NMOS, a sixth NMOS, a seventh NMOS, an eighth NMOS, a first resistor, a second resistor, a third resistor, a fourth resistor, a fifth resistor, a sixth resistor, a seventh resistor, and an eighth resistor, a control voltage input terminal, a supply voltage input terminal, a ground terminal, a first deviation signal output terminal, a second deviation signal output terminal, a third deviation signal output terminal, a fourth deviation signal output terminal, a fifth deviation signal output terminal, a sixth deviation signal output terminal, a seventh deviation signal output terminal, and an eighth deviation signal output terminal;

each NMOS comprising: a gate, a source, and a drain; and each resistor comprising two ends;

wherein the gate of the first NMOS, the gate of the second NMOS, the gate of the third NMOS, the gate of the fourth NMOS, the gate of the fifth NMOS, the gate of the sixth NMOS, the gate of the seventh NMOS, and the gate of the eighth NMOS are connected, and a connecting terminal thereof serves as the control voltage input terminal of the deviation signal generating circuit;

the control voltage input terminal of the deviation signal generating circuit is supplied with a control voltage, and the control voltage enables the first NMOS, the second NMOS, the third NMOS, the fourth NMOS, the fifth NMOS, the sixth NMOS, the seventh NMOS, and the eighth NMOS to work at a ZTC point;

one end of the first resistor, one end of the second resistor, one end of the third resistor, one end of the fourth resistor, one end of the fifth resistor, one end of the sixth resistor, one end of the seventh resistor, and one end of the eighth resistor are connected, and a connecting terminal thereof serves as a supply voltage input terminal of the deviation signal generating circuit; the supply voltage input terminal of the deviation signal generating circuit is supplied with a supply voltage;

the source of the first NMOS, the source of the second NMOS, the source of the third NMOS, the source of the fourth NMOS, the source of the fifth NMOS, the source of the sixth NMOS, the source of the seventh NMOS, and the source of the eighth NMOS are connected, and a connecting terminal thereof serves as the ground terminal of the deviation signal generating circuit;

the drain of the first NMOS is connected to the other end of the first resistor, and a connecting terminal thereof serves as the first deviation signal output terminal of the deviation signal generating circuit; the drain of the second NMOS is connected to the other end of the second resistor, and a connecting terminal thereof serves as the second deviation signal output terminal; the drain of the third NMOS is connected to the other end of the third resistor, and a connecting terminal thereof serves as the third deviation signal output terminal; the drain of the fourth NMOS is connected to the other end of the fourth resistor, and a connecting terminal thereof serves as the fourth deviation signal output terminal; the drain of the fifth NMOS is connected to the other end of the fifth resistor, and a connecting terminal thereof serves as the fifth deviation signal output terminal; the drain of the sixth NMOS is connected to the other end of the sixth resistor, and a connecting terminal thereof serves as the sixth deviation signal output terminal; the drain of the seventh NMOS is connected to the other end of the seventh resistor, and a connecting terminal thereof serves as the seventh deviation signal output terminal; the drain of the eighth NMOS is connected to the other end of the eighth resistor, and a connecting terminal thereof serves as the eighth deviation signal output terminal;

the first NMOS, the second NMOS, the third NMOS, the fourth NMOS, the fifth NMOS, the sixth NMOS, the seventh NMOS, and the eighth NMOS have the same standard;

the first resistor, the second resistor, the third resistor, the fourth resistor, the fifth resistor, the sixth resistor, the seventh resistor, and the eighth resistor have equivalent resistance value no smaller than 10 kΩ;

the first deviation signal output terminal, the second deviation signal output terminal, the third deviation signal output terminal, the fourth deviation signal output terminal, the fifth deviation signal output terminal, the sixth deviation signal output terminal, the seventh deviation signal output terminal, and the eighth deviation signal output terminal of each of the two deviation signal generating circuits are respectively connected to the signal selection circuit; and the signal selection circuit is connected to the comparison output circuit.

2. The circuit of claim 1, wherein the signal selection circuit is formed by two 1-of-8 data selectors comprising a first data selector and a second data selector;

the first deviation signal output terminal, the second deviation signal output terminal, the third deviation signal output terminal, the fourth deviation signal output terminal, the fifth deviation signal output terminal, the sixth deviation signal output terminal, the seventh deviation signal output terminal, and the eighth deviation signal output terminal of the first deviation signal generating circuit are connected to a signal input terminal of the first data selector;

the first deviation signal output terminal, the second deviation signal output terminal, the third deviation signal output terminal, the fourth deviation signal output terminal, the fifth deviation signal output terminal, the sixth deviation signal output terminal, the seventh deviation signal output terminal, and the eighth deviation signal output terminal of the second deviation signal generating circuit are connected to a signal input terminal of the second data selector; and a signal output terminal of the first data selector and a signal output terminal of the second data selector are connected to a signal input terminal of the comparison output circuit.

3. The circuit of claim 1, wherein the first comparison output circuit comprises: a ninth NMOS, a tenth NMOS, an eleventh NMOS, a twelfth NMOS, a thirteenth NMOS, a fourteenth NMOS, a first PMOS, a second PMOS, a third PMOS, and a fourth PMOS;

a source of the ninth NMOS is grounded; a drain of the ninth NMOS, a drain of the tenth NMOS, and a drain of the eleventh NMOS are connected;

a source of the tenth NMOS, a drain of the thirteenth NMOS, and a drain of the fourteenth NMOS are connected;

a source of the eleventh NMOS, a drain of the twelfth NMOS, and a source of the thirteenth NMOS are connected;

a source of the fourteenth NMOS, a drain of the first PMOS, a drain of the second PMOS, a gate of the twelfth NMOS, and a gate of the third PMOS are connected and a connecting terminal thereof serves as a signal output terminal of the comparison output circuit for outputting a response signal;

a source of the twelfth NMOS, a drain of the third PMOS, a drain of the fourth PMOS, a gate of the fourteenth NMOS, and a gate of the second PMOS are connected and a connecting terminal thereof serves as a reverse signal output terminal of the comparison output circuit for outputting a reverse response signal;

a source of the first PMOS, a source of the second PMOS, a source of the third PMOS, a source of the fourth PMOS, and a gate of the thirteenth NMOS are connected and a connecting terminal thereof serves as a source terminal of the comparison output circuit for introducing a supply voltage;

a gate of the tenth NMOS serves as a first signal input terminal of the comparison input circuit, and the first signal input terminal of the comparison input circuit is connected to a signal output terminal of the first data selector; and a gate of the eleventh NMOS serves as a second signal input terminal of the comparison input circuit, and the second signal input terminal of the comparison input circuit is connected to a signal output terminal of the second data selector.

* * * * *